United States Patent [19]
Brasier

[11] 3,906,497
[45] Sept. 16, 1975

[54] AIRBORNE ALTITUDE INDICATOR DEVICE

[75] Inventor: Jean Brasier, Paris, France

[73] Assignee: Thomson-CSF, Paris, France

[22] Filed: Oct. 29, 1973

[21] Appl. No.: 410,320

[30] Foreign Application Priority Data
Oct. 31, 1972  France .............................. 72.38595

[52] U.S. Cl. ............................................... 343/12 A
[51] Int. Cl. .............................................. G01s 9/04
[58] Field of Search ........................ 343/12 A, 12 R

[56] References Cited
UNITED STATES PATENTS

| | | | |
|---|---|---|---|
| 2,556,109 | 6/1951 | Rust et al. ........................... | 343/12 R |
| 2,632,160 | 3/1953 | Rothacker ........................... | 343/12 R |
| 3,140,488 | 7/1964 | Girault ............................... | 343/12 R |
| 3,659,293 | 4/1972 | Gupta .......................... | 343/12 R X |
| 3,710,387 | 1/1973 | Hinchman et al. ................ | 343/12 R |
| 3,761,946 | 9/1973 | Johannessen et al. ............ | 343/12 A |

*Primary Examiner*—Malcolm F. Hubler
*Attorney, Agent, or Firm*—Karl F. Ross; Herbert Dubno

[57] ABSTRACT

An airborne altimeter system indicates the instant when a descending craft equipped with that system reaches a predetermined operating altitude. A transceiver aboard the craft emits a continuous high-frequency sine wave toward the ground and isolates a low-frequency Doppler component from an incoming reflected wave due to ground echoes. The Doppler component is peak-detected and the resulting envelope signal is fed to two passive impedance networks having different transfer functions so that the magnitude ratio of their output signals is equal to a predetermined value as soon as the operating altitude is reached. A comparator derives the desired altitude indication from these output signals to actuate a utilization circuit. In order to make the magnitude ratio of the output signals of the impedance network substantially independent of the rate of descent of the craft, within a predetermined speed range, the envelope signal fed to each network may be weighted by filters of different attenuation characteristics inserted between the transceiver output and respective peak detectors lying in cascade with the two impedance networks.

10 Claims, 5 Drawing Figures

AIRBORNE ALTITUDE INDICATOR DEVICE

The present invention relates to an airborne altimeter system designed to provide an indication when the craft carrying it, which is assumed to be in flight and approaching the ground, arrives at a predetermined altitude.

Generally, such indication consists in the generation of an electrical signal, preferably in the form of a pulse, to be utilized in any of various ways known per se. In particular, the signal may be used to trigger a visual or audible indicator, or to perform some desired control function by means of an ancillary device as soon as the desired height has been attained. Thus, for example, this signal may initiate the air-dropping of cargo.

The distance from the ground is advantageously measured by conventional electromagnetic detection means. A transmitter radiates high-frequency energy toward the ground and a receiver extracts from the reflected signal the Doppler component due to the relative motion of the ground with respect to the airborne radar system. On closer approach to the ground, the amplitude of the low-frequency signal formed by this component increases, which enables altitude to the determined by means of threshold comparison, the threshold value being suitably preset to match the desired altitude.

The frequency F of the Doppler signal is a function of the vertical component $V_z$ of the speed of the carrier craft and of the transmission wavelength $\lambda$, in accordance with the known relationship $F = (2V_z/\lambda)$.

In essence, the amplitude of this signal depends on the following four factors: the height $h$ above the ground, with amplitude increasing when height decreases in proportion $1/h$; - the angle of reception $w$, the field pattern usually being aspherical so that this angle may assume various values; the sensitivity $S$ of the transceiver which is defined as the ratio of the amplitude of the detected low-frequency signal component to the amplitude of the high-frequency wave received, expressed as a percentage of the amplitude of the transmitted high-frequency wave; and the coefficient of reflection $R_s$ of the ground.

The height $h_o$ at which the device operates is thus, a priori, a function of the four parameters $V_z$, $w$, $S$ and $R_s$. To achieve an adequate degree of accuracy, the height $h$ should be linked solely to parameters $V_z$ and $w$ as a predetermined function thereof.

With the aid of known techniques it is possible to make the parameter $S$, representing the sensitivity of the transceiver, a temperature-independent constant, or to compensate for variations therein by accompanying variation in the amplifier gain. Parameter $R_s$, however, remains uncontrolled and is the main cause of the scatter of the operating altitude of the system around the desired value $h_o$.

An object of the invention is to provide an airborne altimeter system of this character whose operating altitude does not depend on the coefficient of reflection of the ground, this system thus overcoming the drawbacks mentioned above.

I realize this object, in accordance with my present invention, by the provision of peak-detection means connected to the transceiver for deriving from the low-frequency Doppler component of the reflected high-frequency sine wave an aperiodic envelope signal proportional to the amplitude of this component, this amplitude varying inversely with ground distance. A pair of passive impedance networks with mutually different transfer functions are connected to the peak-detection means for energization by this envelope signal to generate respective output signals whose magnitude ratio varies progressively upon continuing descent of the craft so as to reach a predetermined value when the desired operating altitude is attained. A comparison circuit, with two inputs respectively connected to these networks, responds to the occurrence of that predetermined value by actuating a utilization means.

The peak-detection means may comprise a single peak detector whose output is connected in parallel to the two impedance networks for feeding the envelope signal to them. Alternatively, the transceiver may have an output circuit divided into two parallel branches each including a peak detector in cascade with a respective impedance network. In the latter instance, the value of the magnitude ratio of the output signals of the networks can be maintained substantially independent of the rate of descent of the craft, within a predetermined speed range, by inserting in these branches a pair of weighting circuits whose transmission characteristics differ from each other in a frequency band of the Doppler component corresponding to that speed range, these weighting circuits being in cascade with the respective peak detectors. The weighting circuits, which may respectively comprise a high-pass filter and a low-pass filter upstream of these peak detectors, advantageously have substantially identical attenuation values at a mean frequency of the Doppler component corresponding to the midpoint of the predetermined speed range.

The above and other features of my invention will now be further described by way of example with reference to the accompanying drawing in which.

Figure 1:
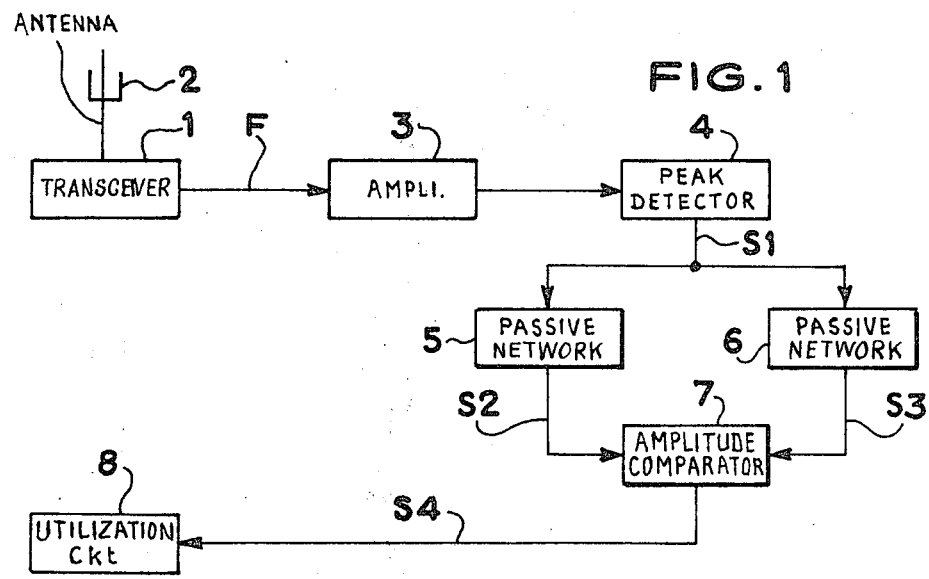
FIG. 1 is a block diagram of a simple altimeter system according to my invention.

The altimeter system shown in FIG. 1 comprises electromagnetic detection means including a transmitter-receiver circuit (or transceiver) 1 and an antenna 2. The circuit 1 comprises means for transmitting a pure, continuous wave (i.e., a sine wave) to the antenna 2 which radiates it towards the ground according to a predetermined field pattern. The transceiver further comprises receiving means designed to select, upon reception, the signal corresponding to the low-frequency component F due to the Doppler shift which is present in the ground echo.

The circuit 1 may consist of an oscillator whose mean output current varies with its load impedance. This oscillator produces a continuous sine wave of a frequency which may be in the VHF band. When a portion of the transmitted energy is reflected by an object in relative motion with reference to the airborne radar, the phase shift of the return wave results in an alteration in the load of the oscillator and thus in an alteration in its mean current. This parameter is preferably derived at a point of the oscillator which is decoupled from the high frequency. The derived signal is thus the low-frequency component due to the Doppler effect and its amplitude varies as a function of the distance separating the radar, and therefore the carrier or aircraft, from the reflecting object which is in relative motion. In the case considered, the reflecting object is formed by the ground and the Doppler signal enables the altitude to be determined.

This low-frequency Doppler signal is applied to amplifier circuits 3 whose response curve is substantially limited to the range of Doppler frequencies liable to be encountered so as to improve the signal-to-noise ratio, and then to a peak-detector circuit 4 which produces the envelope of the amplified Doppler component.

Figure 4:
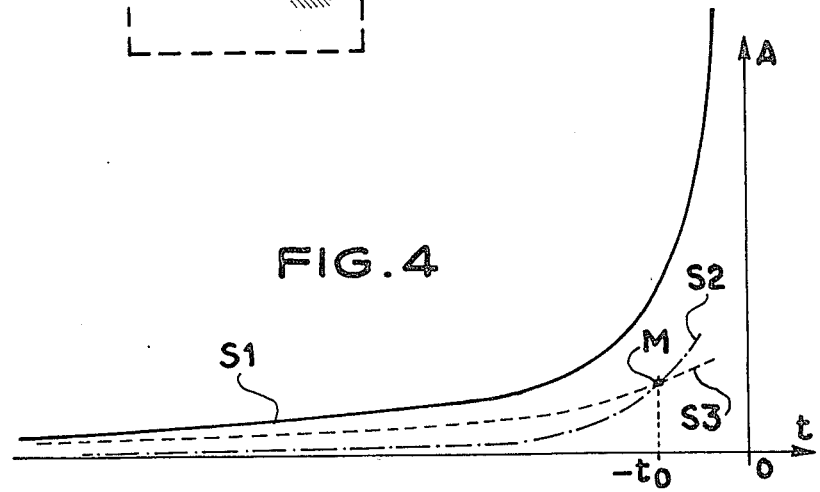
FIG. 4 shows curves relating to the operation of the components of FIG. 3.

The magnitude of the aperiodic envelope signal S1 in the output of the detector circuit 4 corresponds to the variation in time of the amplitude of the Doppler component received, this signal being applied simultaneously to two passive impedance networks 5 and 6 whose transfer functions differ from each other in such a manner that, as shown in FIG. 4, the magnitudes of their respective output signals S2 and S3 have a ratio which varies progressively as a function of the envelope signal S1. The output signals S2 and S3 are then applied to a comparator circuit 7. The latter is so designed as to supply a useful altitude-indicating signal S4 when the ratio of the magnitudes of signals S1 and S2 is of a predetermined value K. As will be shown below, at the instant when this value is produced, the height of the carrier craft above the ground corresponds to the desired operating altitude. The signal S4 is applied to a utilization circuit 8.

The operation is as follows: the signal S1 at the output of the detector 4 is a function of the parameters $h$, $V_z$, $w$, $S$ and $R_s$. The detection system is so arranged as to prevent any premature triggering during the initial phase of the flight when the craft is leaving the ground. During the flight proper, the course of the craft is fairly remote from the ground wherefore the Doppler component due to the ground echo is of very low amplitude which prevents the useful signal S4 from being produced. As the craft approaches the ground this amplitude increases rapidly and the envelope signal S1 becomes significant.

The last four parameters mentioned above are characteristic of conditions prevailing during flight and may be considered constant during the terminal period in which signal S1 is significant, only parameter $h$ varying as a function of time.

If the time origin is taken as the instant in the furture at which the carrier craft would touch down if it were to continue on its descent path, the signal S1 during the terminal phase of flight may be represented by a function of the form $Af(t)$ in which A is a constant dependent on parameters $V_z$, $w$, $S$ and $R_s$, and $f(t)$ is a time function representing the variable $h$. Where other conditions prevail during flight, coefficient A assumes a different value A1 corresponding to the changed magnitudes of the four parameters mentioned. The function $f(t)$ is unchanged and signal S1 is multiplied accordingly by a constant equal to (A1/A).

Since the transfer functions of circuits 5 and 6 are different, signal S1 = $Af(t)$ is converted into a signal S2 = $Y1(t)$ by circuit 5 and into a signal S3 = $Y2(t)$ by circuit 6. The passive components forming the circuits 5 and 6 are such that at an instant $t_o$ specified for the operation, preceding the instant 0 chosen as the origin of the coordinate system, the desired ratio K exists between signals S2 and S3 at the inputs to comparator circuit 7, which results in the useful signal S4 being produced at this time. Since circuits 5 and 6 are assumed to be different, it is not possible for this condition to be satisfied at any other time. Furthermore, since circuits 5 and 6 are linear, when for other flight conditions function $Af(t)$ becomes $A1f(t)$, signals S2 and S3 become (A1/A)Y1 $(t)$ and (A1/A)Y2 $(t)$. The instant at which they are in the ratio K therefore remains the same moment $-t_o$.

The activation of the altimeter system according to my invention is thus brought about at a fixed time $t_o$ before touch-down on the ground. The operating height $h_o = V_z\, t_o$ is independent of the parameters $w$, $S$ and $R_s$, which clearly shows that the principal causes of error due to the coefficient of reflection $R_s$ have been eliminated.

The variation of the height $h = V_z.t$ during the terminal phase as a function of the parameter $V_z$ makes the operating altitude $h_o$ proportional $V_z$. However, the parameter $V_z$ may change within certain limits as a result of different flight conditions encountered by a given craft. As a consequence there is a certain range within which the operating height $h_o$ may vary.

It may be considered necessary to weight the variation of $h_o$ and thus to reduce its range of excursion so as to preserve substantially optimum triggering conditions. With this in view, a system of the type described with reference to FIG. 1 may be improved as shown in the block diagram of FIG. 2 in which corresponding components are identified by the same reference numerals. The amplified Doppler signal is applied simultaneously to two parallel branches in the output of amplifier 3, these branches including a pair of low-frequency filter circuits 10 and 11 which are each followed by a respective peak-detector circuit 40 and 41. The envelope signal S10 detected by 40 is applied to impedance network circuit 5 while signal S11 at the output of circuit 41 is transmitted to impedance network 6. The filter circuits 10 and 11 are so constructed as to introduce coefficients K1 and K2 which depend on the Doppler frequency F and consequently on the value $V_z$. The signals S10 and S11 are thus of the form $K1 \cdot Af(t)$ and $K2\, Af(t)$. The impedance networks 5 and 6 thus respectively supply signals S20 = $K1 \cdot Y1$ $(t)$ and S30 = $K2 \cdot Y2$ $(t)$, which correspond to signals S2 and S3 of FIG. 1 multiplied by the respective coefficients K1 and K2. Time $t_o$ thus occurs when $K1 \cdot Y1$ $(t_o)$ = $K \cdot K2 \cdot Y2$ $(t_o)$. This time depends on the vertical component $V_z$ of the speed of the moving craft while being independent of the other parameters $w$, $S$ and $R_s$. The attenuation characteristics of filter circuits 10 and 11 are selected to give a desired variation in the height function over a selected range of variation of descent rate $V_z$.

Figure 2:
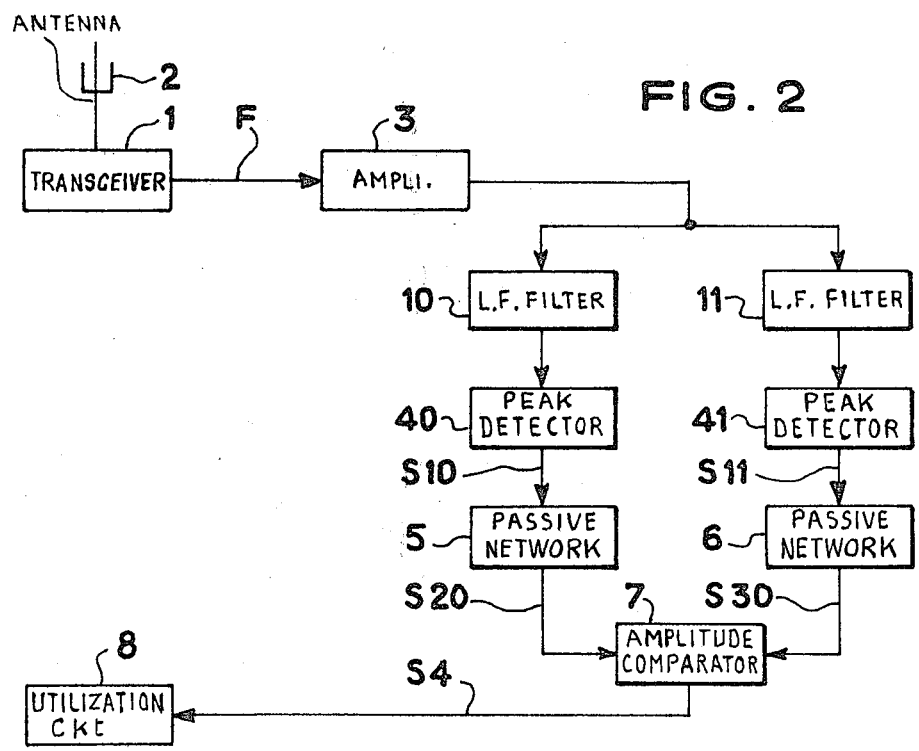
FIG. 2 is a block diagram of a more elaborate version of the system of FIG. 1.
Figure 3:
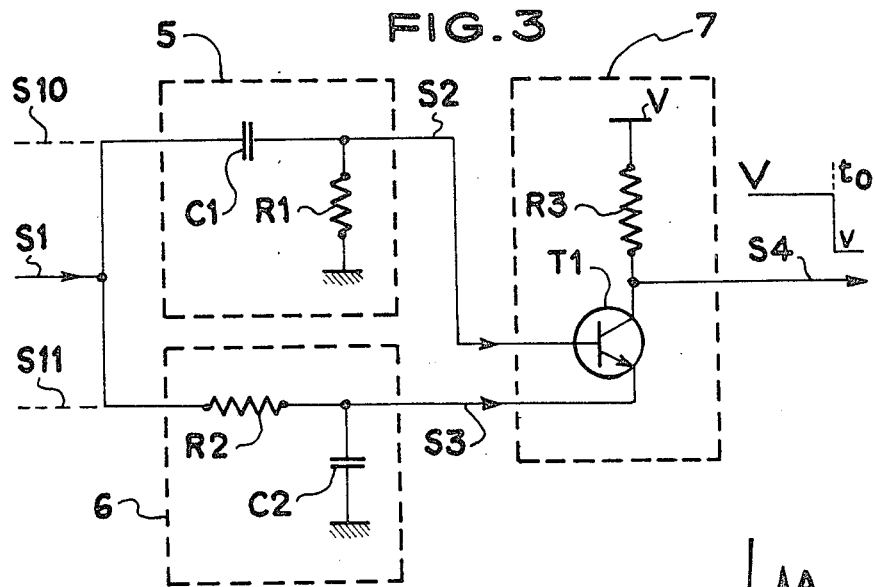
FIG. 3 shows details of specific components of the systems of FIGS. 1 and 2 used to produce an altitude-indicating signal.

FIG. 3 shows details of the circuits 5 to 7 producing the useful signal S4 from the peak-detected signal S1, FIG. 1, or signals S10, S11, FIG. 2. Passive circuit 5 is a differentiation network with a series capacitor C1 and a shunt resistor R1 whereas circuit 6 is an integrating network with a series resistor R2 and a shunt capacitor C2; these impedances are so selected that the respective time constants are equal i.e., C1 . R1 = C2 . R2. In this example, the ratio K is equal to 1 and the comparator circuit 7 is designed to detect equality between output signals S2 and S3. The signal S3 existing at the terminal of capacitor C2 in circuit 6 closely follows the envelope signal S1 when the latter is still varying slowly during the approach phase, as shown by the curves in FIG. 4 where A represents amplitude. Then, as soon as the slope of signal S1 begins to increase more rapidly, signal S3 progressively deviates therefrom. Conversely, signal S2 existing at the terminals of resistor R1 in circuit 5 is initially zero or substantially zero and then increases rapidly. In this simple case it may easily be calculated that the point M at which curves S2 and S3 intersect is situated at a time $t_o$ which lies ahead of the selected time origin O and is substantially equal to 0.61 times the time constant RC of circuits 5 and 6. The time $t_o$ is thus closely determined by the passive components selected to form circuits 5 and 6. The comparator of "equality detector" circuit 7 may be formed by an NPN transistor T1 which receives signal S2 on its base electrode and signal S3 on its emitter electrode and whose collector is connected to a potential V through a resistive load R3. The output signal S4 obtained from the collector drops instantaneously from potential V to a potential $v$ (as shown) when point M is reached at time $t_o$. This negative pulse front is transmitted to utilization circuit 8 to produce the desired action. It is understood that many variants may be envisaged for these circuits, an example being an arrangement similar to circuit 7 but using a PNP transistor which produces a positive voltage change. The choice will be partly dictated by the form of the useful signal required for the utilization circuit 8.

Figure 5:
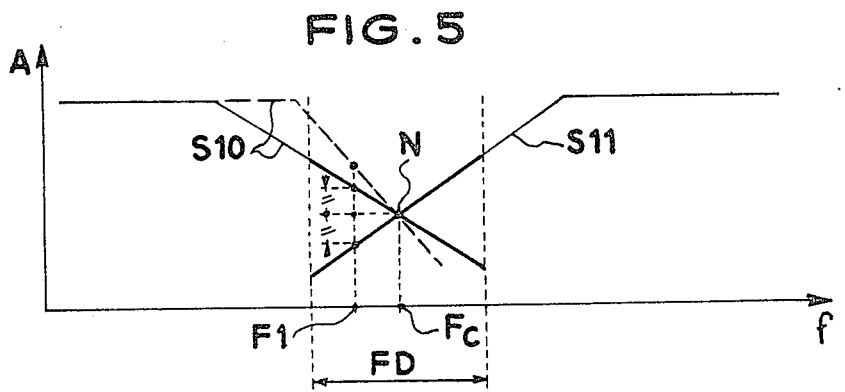
FIG. 5 shows desired response curves for filter circuits included in the embodiment of FIG. 2.

In the embodiment of FIG. 2, one of the low-frequency filters 10 and 11 is of the low-pass type and the other is of the high-pass type in order to obtain the transmission characteristics shown by way of example in FIG. 5 for signals S10 and S11 for a given height h and time t. The two characteristics intersect at a point N corresponding to a Doppler frequency $F_c$ which substantially equals the mean frequency of the range FD of Doppler frequencies corresponding to the expected range of variation in the value of the vertical velocity component or descent rate Vz. In the case shown in solid lines, the variation in amplitude A of the signals as a function of frequency $f$ is considered to be linear and symmetrical in the band FD. Thus, when the Doppler frequency $F_c$ corresponds to the component Vz, the coefficients K1 and K2 introduced by the filters are equal, whereas for another Doppler value such as F1 these coefficients are unequal and differ from their previous value by increments of opposite sign and of the same amplitude. If the slopes of the filter characteristics have unequal absolute magnitudes (see broken-line plot of signal S10) the increments of in K1 and K2 are of different magnitudes. The filters are designed to operate according to the desired weighting law.

The herein described altimeter system has a fundamental advantage in that its operating altitude is independent of the coefficient of reflection of the ground. Furthermore, since the law of height variation is also independent of the sensitivity of the transceiver, it is no longer necessary to compensate for variation in this sensitivity as a function of temperature.

It should also be mentioned that, in comparison with conventional systems in which the production of the useful signal S4 is based on a threshold comparison of the detected signal, the response curves of the amplifier circuits 3 of my system do not necessarily have to have strictly constant characteristics in the Doppler band employed.

In addition, it is also possible to use the same type of system to equip carrier craft of different types, the variation in sensitivity due to mismatching of the antenna having no effect on the reliability of the altimeter.

Of course the invention is not limited to the embodiments described and shown which have been given solely by way of example.

What is claimed is:

1. An airborne altimeter system for indicating the attainment of a predetermined operating altitude by a descending craft carrying same, comprising:
   transceiver means for emitting a continuous sine wave of high-frequency electromagnetic radiation toward the ground, receiving reflected ground echoes of said sine wave and isolating therefrom a low-frequency Doppler component of an amplitude varying inversely with ground distance;
   peak-detection means connected to said transceiver means for deriving from said Doppler component an aperiodic envelope signal proportional to the amplitude thereof;
   a pair of passive impedance networks with mutually different transfer functions connected to said peak-detection means for energization by said envelope signal, said networks generating respective output signals of progressively varying magnitude ratio upon continuing descent of the craft;
   comparison means with two inputs respectively connected to said networks; and
   utilization means connected to said comparison means for actuation upon said ratio reaching a predetermined value.

2. A system as defined in claim 1 wherein said networks are resistance-capacitance circuits.

3. A system as defined in claim 2 wherein said resistance-capacitance circuits are an integrating network and a differentiation network, respectively.

4. A system as defined in claim 3 wherein said integrating and differentiation networks have substantially identical time constants.

5. A system as defined in claim 1 wherein said peak-detection means comprises a single peak detector having an output connected in parallel to said networks.

6. A system as defined in claim 1 wherein said peak-detection means comprises a pair of peak detectors, said transceiver means having an output circuit with two parallel branches each including one of said peak detectors in cascade with one of said networks.

7. A system as defined in claim 6, further comprising a pair of weighting circuits of different transmission characteristics in a frequency band of said Doppler component corresponding to a predetermined speed range, said weighting circuits being inserted in said branches in cascade with said peak detectors to maintain the value of said ratio substantially independent of the rate of descent of the craft within said speed range.

8. A system as defined in claim 7 wherein said weighting circuits comprise a low-pass filter and a high-pass filter each lying between said transceiver means and a respective peak detector.

9. A system as defined in claim 8 wherein said filters have substantially identical attenuation values at a mean frequency of said Doppler component corresponding to the midpoint of said speed range.

10. A system as defined in claim 9 wherein the attenuation characteristics of said filters are of substantially symmetrical slope within said frequency band.

* * * * *